April 6, 1937.   R. A. FLIESS   2,075,808
METHOD AND APPARATUS FOR OBSERVING BODIES THROUGH OPAQUE SUBSTANCES
Filed Nov. 21, 1930   5 Sheets-Sheet 4

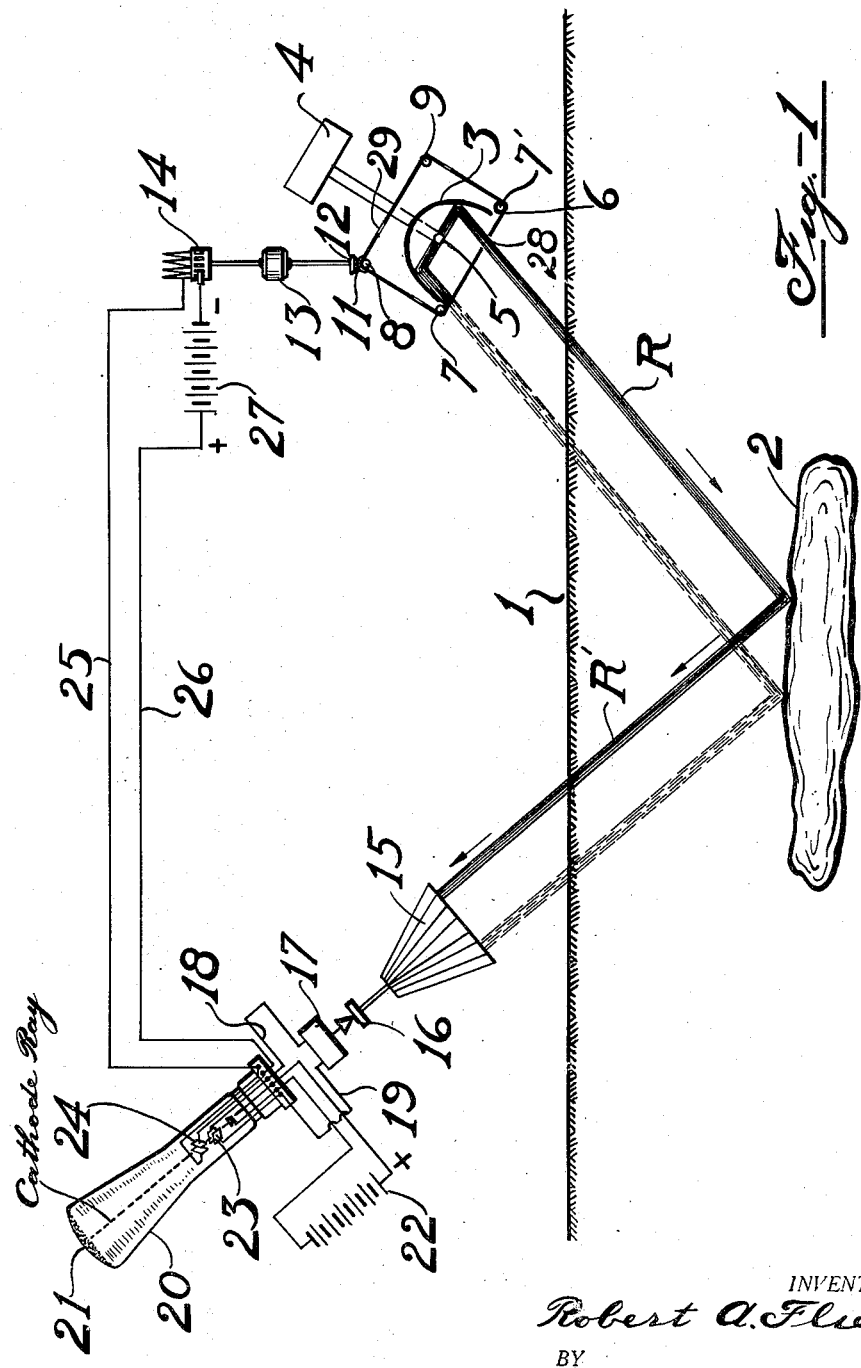

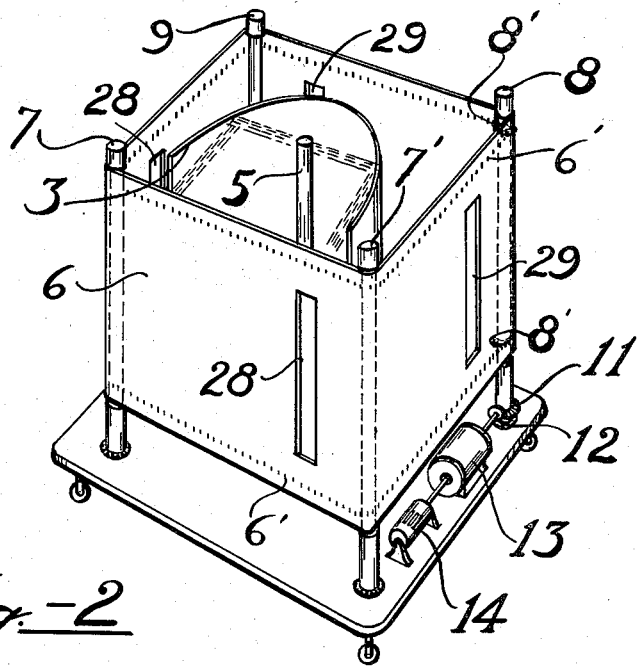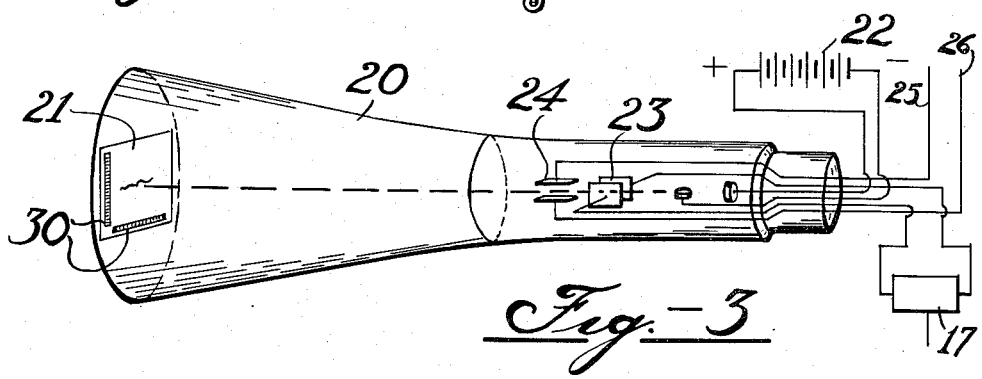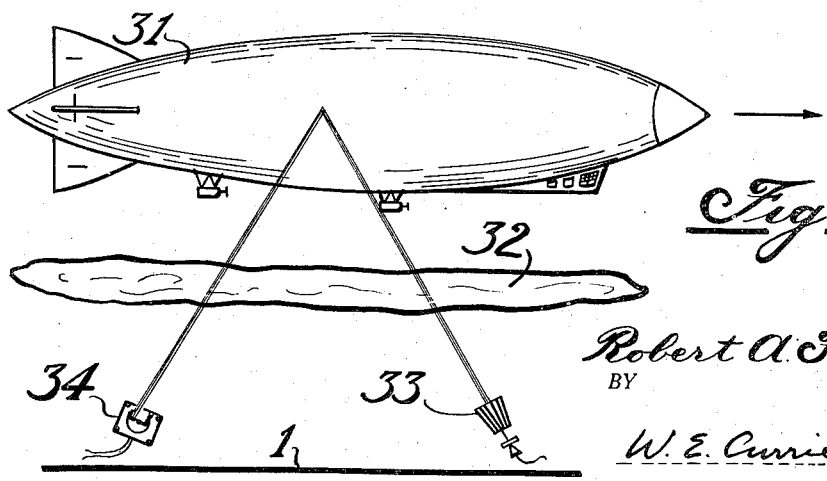

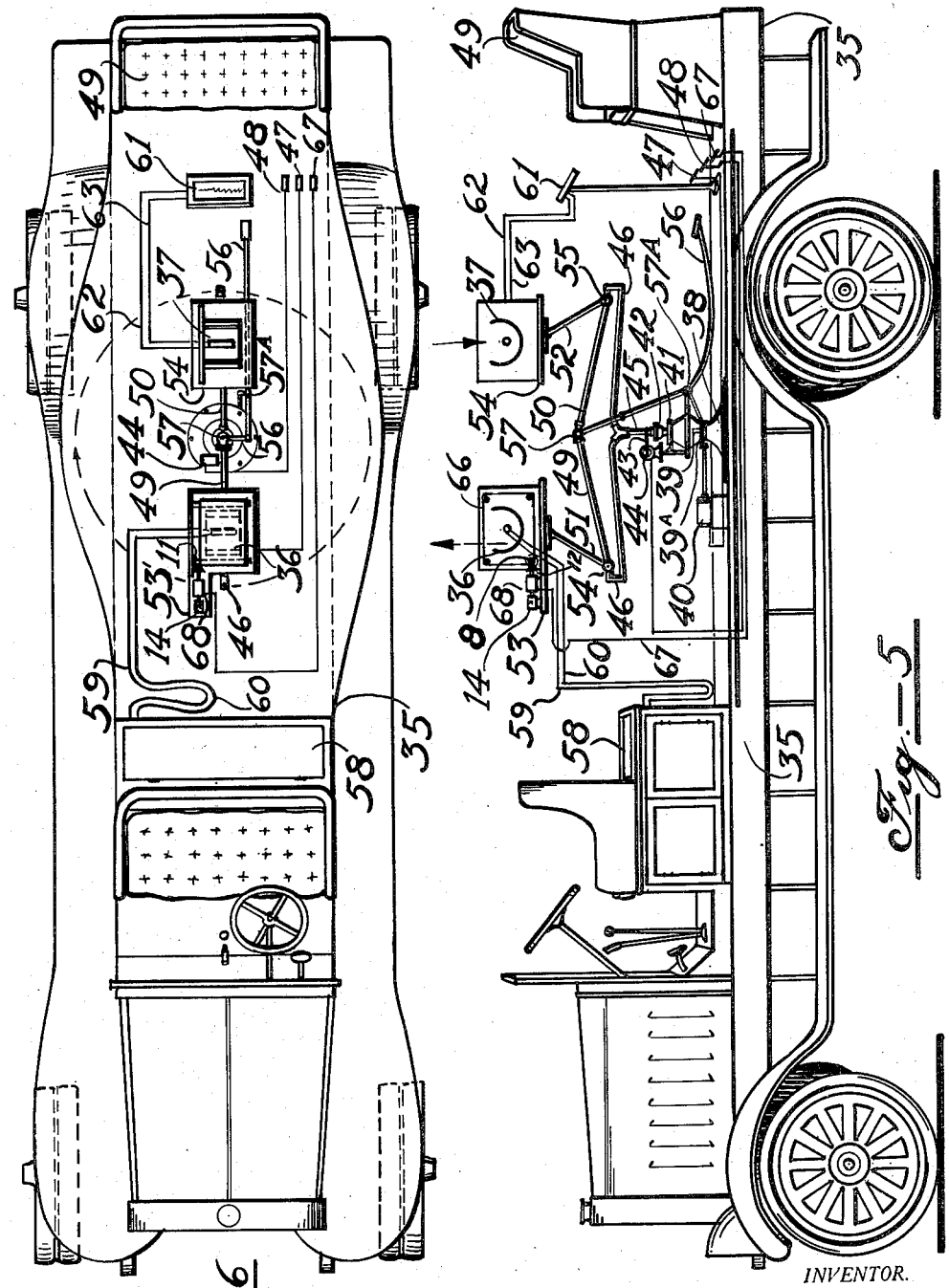

INVENTOR.
Robert A. Fliess
BY
W. E. Currie ATTORNEY.

April 6, 1937.   R. A. FLIESS   2,075,808
METHOD AND APPARATUS FOR OBSERVING BODIES THROUGH OPAQUE SUBSTANCES
Filed Nov. 21, 1930    5 Sheets-Sheet 5
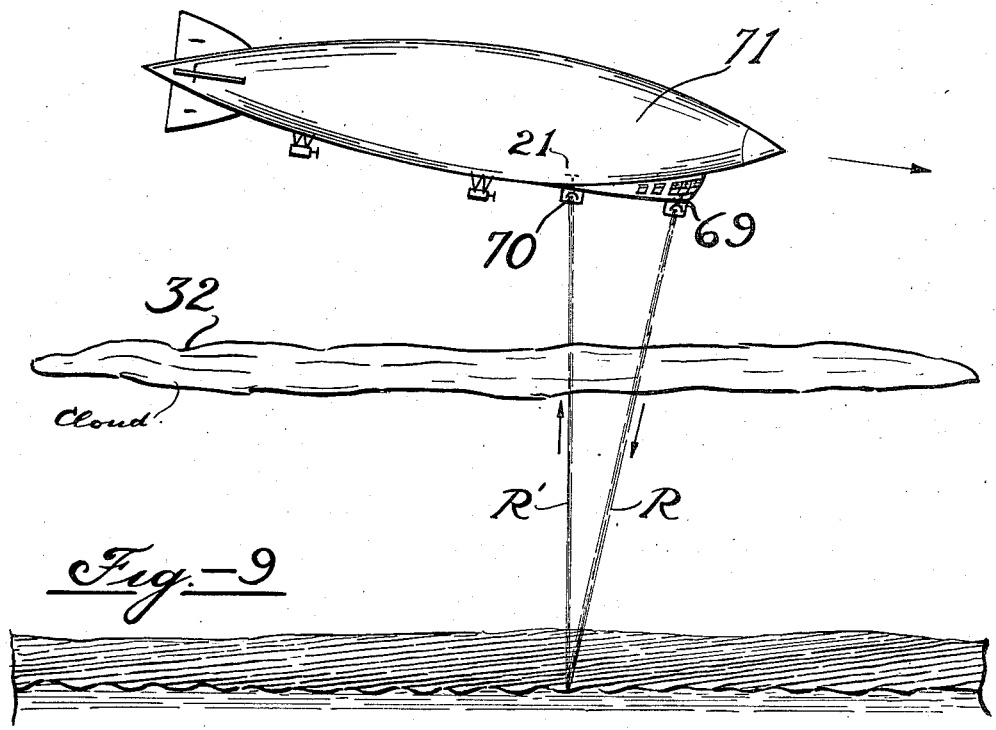
Fig.-9
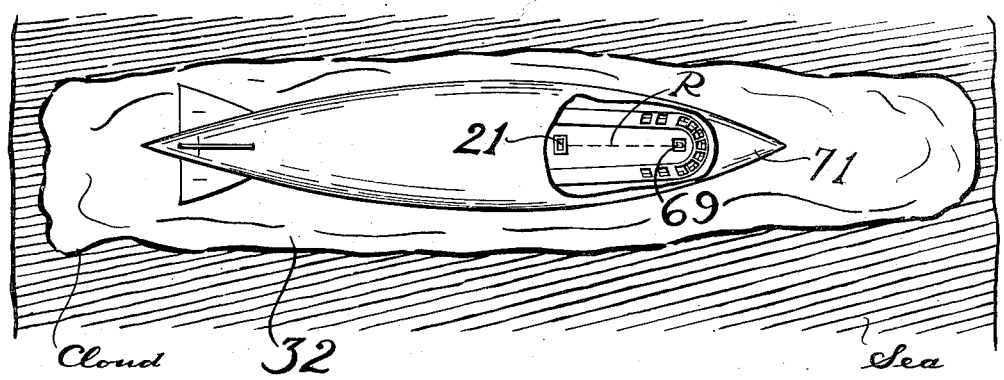
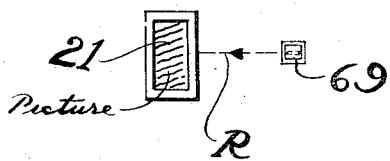
Fig.-10
INVENTOR.
Robert A. Fliess
BY
W. E. Currie ATTORNEY Patented Apr. 6, 1937

2,075,808

UNITED STATES PATENT OFFICE 2,075,808

METHOD AND APPARATUS FOR OBSERVING BODIES THROUGH OPAQUE SUBSTANCES

Robert A. Fliess, New York, N. Y.

Application November 21, 1930, Serial No. 497,129

6 Claims. (Cl. 175—182)

This invention relates to improvements in the utilization of reflected electromagnetic waves. A primary purpose of the invention is to provide a method for securing an integrated visual indication of reflecting bodies at, under, or above, the surface of the earth, although such bodies may be hidden from the unaided sight by opaque substances. The integrated indication obtained by the present invention may be a simple integrated visual signal.

To accomplish this result, use is made of directed beams of electromagnetic waves having a wave length greater than the wave length of infra-red rays of light, as the lower limit, and less than the wave length which would be impractical to transmit or receive, as the upper limit. Within this range, depending upon various conditions, I may use waves of any desired length. All such waves are characterized by the ability to penetrate bodies which are opaque to light.

Thus by the use of the present invention the geophysicist may inspect the surface of strata which are buried deep beneath the surface of the earth, the aviator or mariner may detect the presence of reflecting bodies although hidden from view by clouds, fog or smoke screens, and workers on land may visualize reflecting objects which are hidden by masonry, embankments, or the like. These uses of the invention are merely illustrative; many others are possible and will be obvious from the following description.

The invention will be fully described in connection with the accompanying drawings in which Fig. 1 is a diagrammatic side elevation of one form of equipment adapted for use in geophysical exploration;

Fig. 2 is an enlarged perspective view of the reflector and scanning belt of Fig. 1;

Fig. 3 is a diagram illustrating the action of one form of oscillograph tube;

Fig. 4 is a diagrammatic view showing the use of the invention in detecting the position and determining the speed of a dirigible;

Fig. 5 is a side elevation showing one form of equipment adapted for rapid transportation;

Fig. 6 is a top plan view of the same;

Fig. 9 is a side view of dirigible above a cloud showing another use of the invention; and Fig. 10 is a top view of dirigible above a cloud and an enlarged view of picture received.

Figure 8:
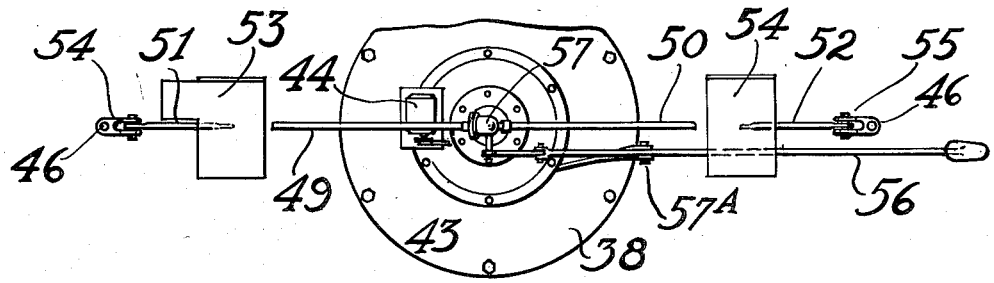
Fig. 8 is a top plan view of Fig. 7.
Figure 7:
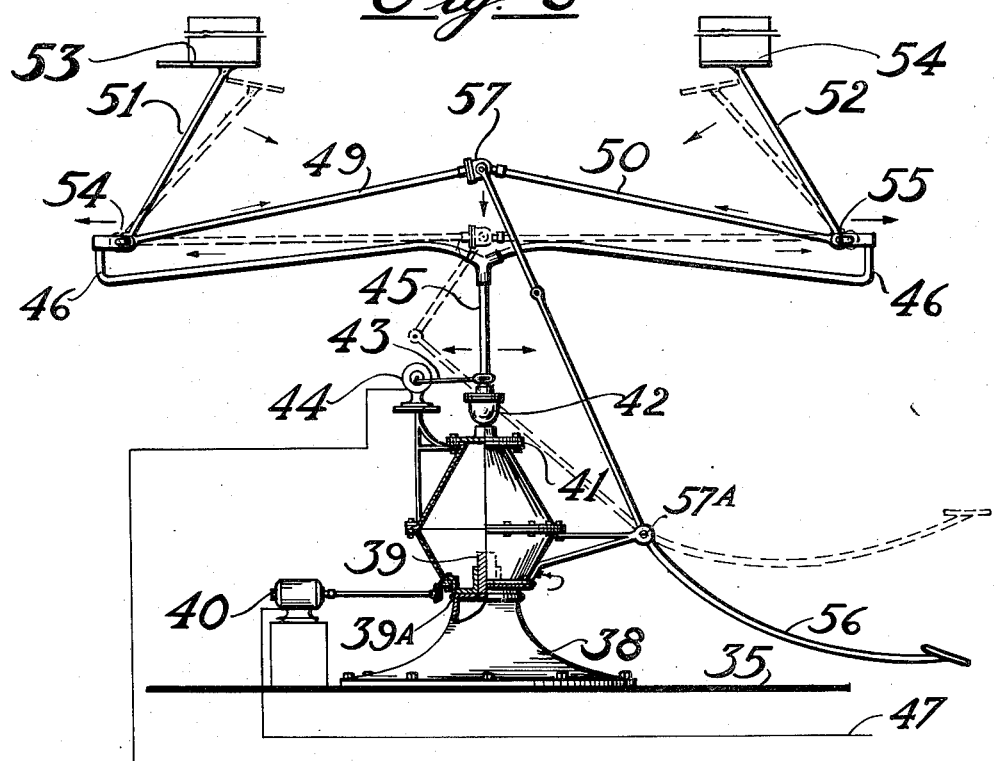
Fig. 7 is a detail side elevation of the rotary supporting means of Figs. 5 and 6.

Referring first to Figs. 1 and 2, reference numeral 1 indicates the surface of the earth and 2 an ore body, oil sand, or other deposit capable of reflecting electromagnetic waves and located at a substantial distance beneath the earth's surface. A parabolic reflector 3, mounted on any suitable support, not shown, is arranged to direct a beam of electromagnetic waves downward in the direction of the deposit 2. A transmitter 4, preferably capable of generating ultra-short electromagnetic waves, as hereinafter defined, is connected with a radiating body 5 at the focus of the reflector. In using this type of equipment it is preferred to follow the method described in my copending U. S. patent application, Serial No. 19,113, filed Mar. 25th, 1925. However, the present invention is not limited to that method of operation.

A belt 6 is mounted for rotation on a plurality of rollers, which may be four in number designated 7—7', 8, 9. These rollers are arranged at the corners of a four-sided figure. One of these rollers, 8, has at its base a gear 11 which meshes with a gear 12 on the shaft of a motor 13. The other end of the motor shaft is directly connected to a synchronizing commutator 14.

A multiple receiving antenna 15 is placed at a suitable distance from the transmitter. The antenna is connected with a detector 16 and an amplifier 17, which may be of any suitable kind. The amplified current passes through the lead wires 18 and 19 into the oscillograph tube 20. This has the usual electrodes for the production of a cathode ray and there is a fluorescent screen 21 at the further end of the tube. A suitable electric current for producing the cathode ray is supplied by the battery 22.

In accordance with this invention, two sets of deflector plates 23 and 24 (Figs. 1 and 3) are arranged in the oscillograph tube 20 along the axis of the cathode ray. Plates 24 are connected by lead wires 25 and 26 through a battery 27 to the synchronizing commutator 14. Plates 23 receive current from the lead wires 18 and 19 connected to the amplifier 17.

It will be observed that the motor 13 is directly connected to the driving roller 8 and the commutator 14. The construction of the commutator is such that it closes the circuit through leads 25 and 26 whenever any one of the openings or slits 28 and 29 in the belt 6 starts to pass in front of the reflector opening 3. Therefore, the action of deflecting plates 24 is synchronized with the passage of a slit across the reflector opening. In other words, the progressively varying potential placed on the plates 24 tends to pull the stream of electrons forming the cathode ray across the face of the fluorescent material 21 at a speed which is exactly that of the opening in the belt.

The function of the belt, which is preferably made of flexible metal and rotated at high speed, is to subdivide the high frequency beam which is being radiated and reflected, into elemental areas of a predetermined width and length. This effect is accomplished by openings suitably spaced in the belt, as indicated above. When it is rotated, a beam of electromagnetic waves sweeps across the face of the subterranean deposit 2, illustrated in Fig. 1, from left to right as indicated by the arrow. The belt is preferably caused to rotate at a speed such that there are at least four exposures per second and as a result, a minimum of four sweepings of the face of the deposit per second. It will be understood, however, that the rate of rotation may be varied as circumstances require.

The reflected part R' of the incident ray R sweeps across the face of the multiple antenna 15. The result is a current in the amplifier 17 which increases and decreases in intensity in proportion to the strength of the reflected part of the incident ray. The reflected part will increase and decrease in intensity in accordance with the reflective qualities of the subterranean deposit across which the beam is sweeping. The greater the reflective power of the deposit, the greater the strength of the reflected part of the incident ray.

The energy received by the antenna acts through the detector and amplifier upon a stream of electrons in the oscillograph tube 20. The variation in strength of the received energy causes the cathode ray of the tube to move up and down proportionately.

As shown in Fig. 3, the result of this action is a fluorescent line traced across the surface of the screen 21. The resultant line indicates exactly the reflective contour outline of the surface across which the beam is passing. As a consequence of the perfect synchronism between the generating and receiving equipment, any variation of strength of the reflected part of the incident ray may be located exactly by means of a suitable scale 30.

In using the method for geophysical exploration, the operator sets up the transmitting and receiving equipment in the region to be explored, makes a reading, and moves the equipment to other stations so that the entire area may be investigated. The angle at which the beam of electromagnetic waves enters the earth is preferably about as shown in Fig. 1. The distance between the transmitting and receiving stations is preferably determined by the depth to which it is desired to penetrate. Both the angle and distance may of course be varied to meet diverse conditions in the field. The operator may only note directly the nature of the integrated visual indications received, or he may also cause them to be recorded photographically or otherwise.

The specific visual indications perceived are the "integrated visual indications" which are the direct result of the progressive sweep across the hidden reflecting surface or object of a directed beam of electromagnetic waves. The "integrated visual indications" that appear on the fluorescent screen of the cathode ray oscillograph receiving tube are the direct result of the variations in intensity of the reflected portion of the incident beam as it is caused to sweep progressively across the hidden reflecting surface.

I prefer to use ultra short electromagnetic waves. These may be defined for the purpose of this invention as having a frequency of the order of 30,000 to 1,200,000 kilo-cycles. Any suitable form of transmitter may be used for the propagation of this type of waves. The receiving equipment will of course be tuned to respond to frequencies of the order stated.

It will be understood, however, that the present invention is by no means limited to the particular range or type of waves just referred to. These have been found most suitable for underground exploration or for penetrating large masses of highly opaque substances. For work at the surface of the earth or in the air it is feasible to use much longer waves. Limitations are imposed by the transmitting and receiving equipment now available. However, with the further development of radio equipment it may be possible to use even longer or shorter wave lengths than specified above and nevertheless obtain all the practical advantages of this invention.

The foregoing description has been based on the use of the invention in determining underground structure and the presence of reflecting deposits. There will now be described a use of the invention for determining the position and speed of a reflecting body passing through the air such as an airplane or dirigible having a metallic body.

In Fig. 4, numeral 31 designates a dirigible having a metallic shell and passing high above the surface of the earth while obscured from it by a cloud or smoke screen 32. The transmitting and receiving instruments are designated respectively 33 and 34.

One suitable form of apparatus for aerial purposes as just described, is shown in Fig. 5. A truck, or other suitable conveyance 35 carries a transmitting reflector 36, connected for sending out beams of electromagnetic waves. A receiving reflector 37 is arranged at a proper distance from the transmitting reflector. This distance is preferably as large as can be conveniently arranged on the vehicle. Separate vehicles may of course be used under some conditions for the transmitting and receiving equipment. The movement of the vehicles may be synchronized by any suitable means.

A pedestal 38 and shaft 39 carry a collar 39A adapted to be rotated by a motor 40. Supported by the collar is a support 41 carrying a universal joint 42. Connected above this joint to a shaft 43 is a motor 44. The arm 45 carries a support 46 which in turn bears a toggle arm device, subsequently described more fully, on which the reflectors 36 and 37 are mounted.

The leads from the motors 40 and 44 run to control pedals 47 and 48 arranged in a position convenient to the operator's seat 49. By means of the construction described, the whole transmitting and receiving system may be rotated in either or both a horizontal and a vertical plane.

Also, the two reflectors 36 and 37 may be adjusted with respect to each other so as to vary the point of intersection of the axes of the incident and reflected beams. Any suitable mechanical device for effecting this adjustment may be used. In the form shown there are two arms 49 and 50, having rigidly mounted thereon connecting bars 51 and 52 secured respectively to the base of supports 53 and 54 carrying the reflectors 36 and 37. The lever systems 49, 51, and 50, 52, have their pivots at 54 and 55. An actuating rod 56 is connected by means of a universal joint 57 to arms 49 and 50 and to a support at 57A. The end of the rod 56 is near the operator's seat. When the rod is moved downward the reflectors 36 and 37 are tilted away from each other, and when the rod is drawn upward they are tilted toward each other.

In Fig. 5 the various electrical connections for energizing the transmitter and receiver are shown only in fragmentary form, for simplicity. The source of electromagnetic waves with its auxiliary apparatus is indicated generally by 58 and the lead wires 59 and 60 from it pass to the transmitter 36. The oscillograph tube 20 is mounted on an instrument board 61 which is connected with its auxiliary apparatus and the receiving reflector by lead wires 62 and 63.

A motor 68 is geared directly to the driving roller 8 of a scanning belt 66, which is adapted to rotate about the transmitting reflector 36. The control wire for this motor is connected with a pedal 67 near the operator's seat.

The method of operating this apparatus is as follows:

The operator seated before the instrument board 61 rotates the transmitting and receiving reflectors 36 and 37 with their auxiliary apparatus as a unit in a horizontal plane, by means of motor 40 and its connections, and in a vertical plane by means of motor 44 and its connections. The point of intersection of the axes of the two reflectors is controlled by the rod 56 and its connecting members. The speed of the scanning belt 66 is controlled by proper regulation of motor 68. In this way the operator has complete control of the incident beam and its reflected portion, which is automatically received by reflector 37.

Assuming that the object to be detected is a metallic dirigible 31, as shown in Fig. 4, the operator rotates the reflecting mechanisms as a unit both about the horizontal and vertical axes and varies their relation to each other until an integrated reflection is indicated on the fluorescent screen of the oscillograph tube. This indicates to the observer that he has hit a reflecting body with the beam of electromagnetic waves. He then follows this target with the beam, observing its integrated reflecting action as shown on the fluorescent screen in the oscillograph tube.

It is possible by this invention not only to detect the presence of reflecting bodies although moving at high speed, but also to determine their contour or outline and the rate at which they are travelling. I am aware that it has heretofore been suggested to send electromagnetic waves from a ship at sea and receive thereon the waves reflected from another ship. The present invention, however, goes far beyond this, in that it enables the operator to secure definite information as to the nature of the target at which he aims.

One way of determining the speed of the moving object is to discontinue the movements of the transmitter and reflector in the horizontal and vertical planes, while increasing or decreasing the speed of the metallic scanning belt until the integrated visual indication of the object remains stationary on the screen of the oscillograph tube. Then knowing the angle at which the transmitted beam emerges and the reflected beam is received, and the speed at which the belt is moving, it is easy to calculate the speed of the object on which the beam is constantly retained. The instruments on the instrument board may be suitably calibrated to indicate directly the speed in miles and the height in feet, or other units, corresponding to a predetermined variation of the picture visible in the instrument board.

It will be seen that the operator can read both the speed and height of the target. This can be done simultaneously and altogether independently of the presence of opaque bodies between the operator and the target.

It will be understood that the foregoing description is for illustration only. There are many other mechanical arrangements which are suitable for use and many other uses which may be made of the invention. For example, there may be mentioned the indication of the location of buried metallic equipment such as metallic pipe. Also the invention is capable of use in aiding aviators to reach landing fields which may be obscured by clouds or fog and when mounted on a dirigible or airplane can be calibrated to record the drift of the machine, though the ground or water is completely hidden from the view of the pilot. This latter use is diagrammatically illustrated in Figs. 9 and 10 in which 71 is a dirigible or airplane carrying transmitting and receiving reflectors 69 and 70. Variation in the integrating visual indication produced on the fluorescent screen is caused by any shift in the course of the airplane.

Various changes and alternative arrangements may be made in the scope of the appended claims in which it is my intention to claim all novelty inherent in the invention as broadly as the prior art permits.

I claim:

1. Method of charting bodies obscured from sight by opaque substances comprising directing a beam of electromagnetic waves toward the body receiving the reflected portion of the waves, causing the same to produce an integrated visual indication and synchronizing the integrated indication with the interrupton of the passage of the electromagnetic waves from the transmitting source.

2. Apparatus for locating bodies obscured from sight by opaque substances, comprising a reflector, means for directing therefrom a beam of electromagnetic waves, rotatable means encircling the reflector and raving openings therein through which electromagnetic waves may pass at regularly recurring intervals, and means for receiving the reflected portion of the electromagnetic waves.

3. Apparatus according to claim 2, including a multiple receiving antenna, detecting and amplifying means connected thereto, and an oscillograph tube connected to the amplifying and detecting means.

4. Method of observing bodies obscured from sight by opaque substances which comprises directing a beam of electromagnetic waves across the body, receiving the reflected portion of the waves and causing the same to act upon a fluorescent screen in a receiving apparatus in such a way that an integrated visual indication of the variation of the intensity of reflection from the body is obtained.

5. Method of determining the position and speed of a reflecting moving body hidden from sight by an opaque substance, comprising locating the reflected body by directing against it a beam of electromagnetic waves transmitted through a progressively rotating perforated belt, receiving the reflected portion of such waves and determining from the angle of incidence and reflection as between the transmitted and reflected waves and the rate at which the rotating belt associated with the transmitter is traveling, the position and speed of the reflecting moving body.

6. Apparatus for determining the location and characteristics of sub-surface strata, comprising a vehicle, means thereon for producing and directing a beam of electromagnetic waves and for receiving the reflected portion of the transmitted beam, means mounted on the vehicle for moving the receiver synchronously with the transmitter, and a receiver adapted to receive the electromagnetic waves reflected from the sub-surface strata, and means for causing the reflected waves to produce an integrated visual indication of the sub-surface strata.

ROBERT A. FLIESS.